US008787768B2

(12) United States Patent
Klotz et al.

(10) Patent No.: US 8,787,768 B2
(45) Date of Patent: Jul. 22, 2014

(54) METHOD AND APPARATUS FOR SYNTHESIZING AND CORRECTING PHASE DISTORTIONS IN ULTRA-WIDE BANDWIDTH OPTICAL WAVEFORMS

(75) Inventors: Matthew J. Klotz, Pasadena, CA (US); Jean-Paul Bulot, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 560 days.

(21) Appl. No.: 12/793,028

(22) Filed: Jun. 3, 2010

(65) Prior Publication Data

US 2011/0299849 A1    Dec. 8, 2011

(51) Int. Cl.
*H04B 10/00* (2013.01)
*H04B 10/67* (2013.01)
*H04B 10/073* (2013.01)

(52) U.S. Cl.
CPC ............ *H04B 10/073* (2013.01); *H04B 10/676* (2013.01)
USPC .......................................... 398/159; 398/158

(58) Field of Classification Search
USPC .............................. 398/208, 159, 158, 147, 81
See application file for complete search history.

(56) References Cited

U.S. PATENT DOCUMENTS

| 4,968,968 | A | 11/1990 | Taylor |
| 5,289,252 | A | 2/1994 | Nourrcier |
| 7,345,744 | B2 | 3/2008 | Halmos et al. |
| 7,606,498 | B1 | 10/2009 | Wu et al. |
| 2007/0071456 | A1 | 3/2007 | Chen et al. |
| 2008/0232821 | A1* | 9/2008 | Malouin et al. ............... 398/202 |
| 2010/0002810 | A1 | 1/2010 | Li et al. |
| 2010/0232809 | A1* | 9/2010 | Cai et al. ........................ 398/202 |
| 2010/0321107 | A1* | 12/2010 | Honcharenko ........... 330/124 R |

OTHER PUBLICATIONS

Extended European Search Report dated Sep. 20, 2011 of European Application No. 111592415.6 filed Mar. 22, 2011 (6 pages).

* cited by examiner

*Primary Examiner* — M. R. Sedighian
(74) *Attorney, Agent, or Firm* — Burns & Levinson LLP; Joseph M. Maraia

(57) ABSTRACT

In accordance with various aspects of the disclosure, a method, an apparatus and a system for characterizing and compensating for deterministic phase nonlinearities and distortion inherent in radio frequency and optical components utilized to synthesize a single sideband suppressed carrier optical waveform in the presence of random phase noise generated by an optical carrier source is disclosed. The method comprises mixing a modulated optical signal with a continuous wave optical signal in an optical coupler; optically heterodyning the mixed signal output from the optical coupler in a detector to produce a radio frequency waveform; and analyzing the produced radio frequency waveform in a processor based on a phase history of a preselected continuous wave signal to measure distortion characteristics of the radio frequency modulated optical signal.

10 Claims, 8 Drawing Sheets

METHOD AND APPARATUS FOR SYNTHESIZING AND CORRECTING PHASE DISTORTIONS IN ULTRA-WIDE BANDWIDTH OPTICAL WAVEFORMS

BACKGROUND

This disclosure relates generally to the field of optics and, more specifically, to a method and apparatus for synthesizing and correcting phase distortions in ultra-wide bandwidth optical waveforms.

Conventionally, the process of synthesizing extremely high bandwidth, single-sideband, linear frequency modulated optical waveforms is complicated. Radio frequency (RF) and optical components can introduce gain, phase delay, nonlinearity and/or other distortion phenomena into the waveform synthesis procedure.

What is needed is a waveform synthesis method and apparatus capable of characterizing and at least minimizing, if not eliminating, deterministic waveform distortion arising from RF and optical components in the presence of laser phase noise.

SUMMARY

In accordance with various embodiments of this disclosure, a method for characterizing and compensating for deterministic phase nonlinearities and distortion inherent in radio frequency and optical components utilized to synthesize a single sideband suppressed carrier optical waveform in the presence of random phase noise generated by an optical carrier source is disclosed. The method comprises mixing a modulated optical signal with a constant frequency optical signal in an optical coupler; optically heterodyning the mixed signal output from the optical coupler in a detector to produce a radio frequency waveform; and comparing the produced radio frequency waveform in a processor based on a known, theoretical phase history of a preselected continuous wave signal to measure distortion characteristics of the radio frequency modulated optical signal.

In accordance with various embodiments of this disclosure, a system for characterizing and compensating for deterministic phase nonlinearities and distortion inherent in radio frequency and optical components utilized to synthesize a single sideband suppressed carrier optical waveform in the presence of random phase noise generated by an optical carrier source is disclosed. The system comprises an optical coupler configured to mix a modulated optical signal with a constant frequency optical signal; an optical detector configured to receive the mixed signal output from the optical coupler and optically heterodyne the mixed signal to produce a radio frequency waveform; and a processor in communication with a memory having instructions stored therein which, when executed compare the produced radio frequency waveform to a known, theoretical phase history of a preselected continuous wave signal and measure distortion characteristics of the radio frequency modulated optical signal.

In accordance with various embodiments of this disclosure, a computer-readable physical medium including instructions that, when executed by a processor, cause the processor to carry out functions related to compensating for deterministic phase nonlinearities and distortion in a radio frequency and optical components utilized to synthesize a single sideband suppressed carrier optical waveform is disclosed. The functions include generating a first waveform comprising a linear frequency modulated chirp; determining a distortion component from a received second waveform; and modifying the first waveform using the determined distortion component to compensate for the deterministic phase nonlinearities and distortion of the received second waveform produced by the radio frequency components and the one or more optical components.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

DETAILED DESCRIPTION

Figure 1:
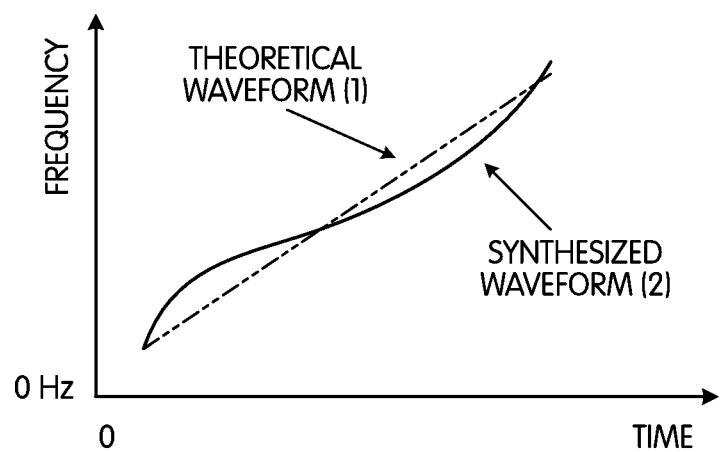
FIG. 1 shows a comparison between theoretical and synthesized waveforms.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

FIG. 1 depicts a theoretically perfect, linearly frequency modulated waveform (1) in comparison to a typical synthesized waveform (2) containing distortion created by real-world RF and optical components. The distortion is shown graphically as the solid curved line (2), deviating from the dashed theoretical waveform (1) and changing as a function of time during waveform synthesis.

The theoretical linear frequency modulated waveform (1) has a time-frequency relationship given by Equation 1 and a time-phase relationship given by Equation 2. Real-world linear frequency modulated waveforms (2) have a time-phase relationship similar to Equation 2, but possess a time-dependent deterministic phase distortion component, $\phi_D(t)$, and a random noise phase component, $\phi_N(t)$, shown in Equation 3.

$$\mu = \frac{\Delta f}{\Delta t} \qquad 1$$

$$\phi_{THEO}(t) = 2\pi f_{RF} t + \frac{\mu t^2}{2} \qquad 2$$

$$\phi_{SIG}(t) = 2\pi f_{RF} t + \frac{\mu t^2}{2} + \phi_D(t) + \phi_N(t) \qquad 3$$

In order to characterize and eliminate the time-dependent, deterministic distortion from real-world waveforms, $\phi_D(t)$, two criteria should be considered. First, a waveform synthesis technique and methodology that enables the simultaneous synthesis and characterization of linearly frequency modulated optical waveforms. Second, an algorithm capable of measuring and compensating for the distortion in linearly frequency modulated optical waveforms.

Figure 2:
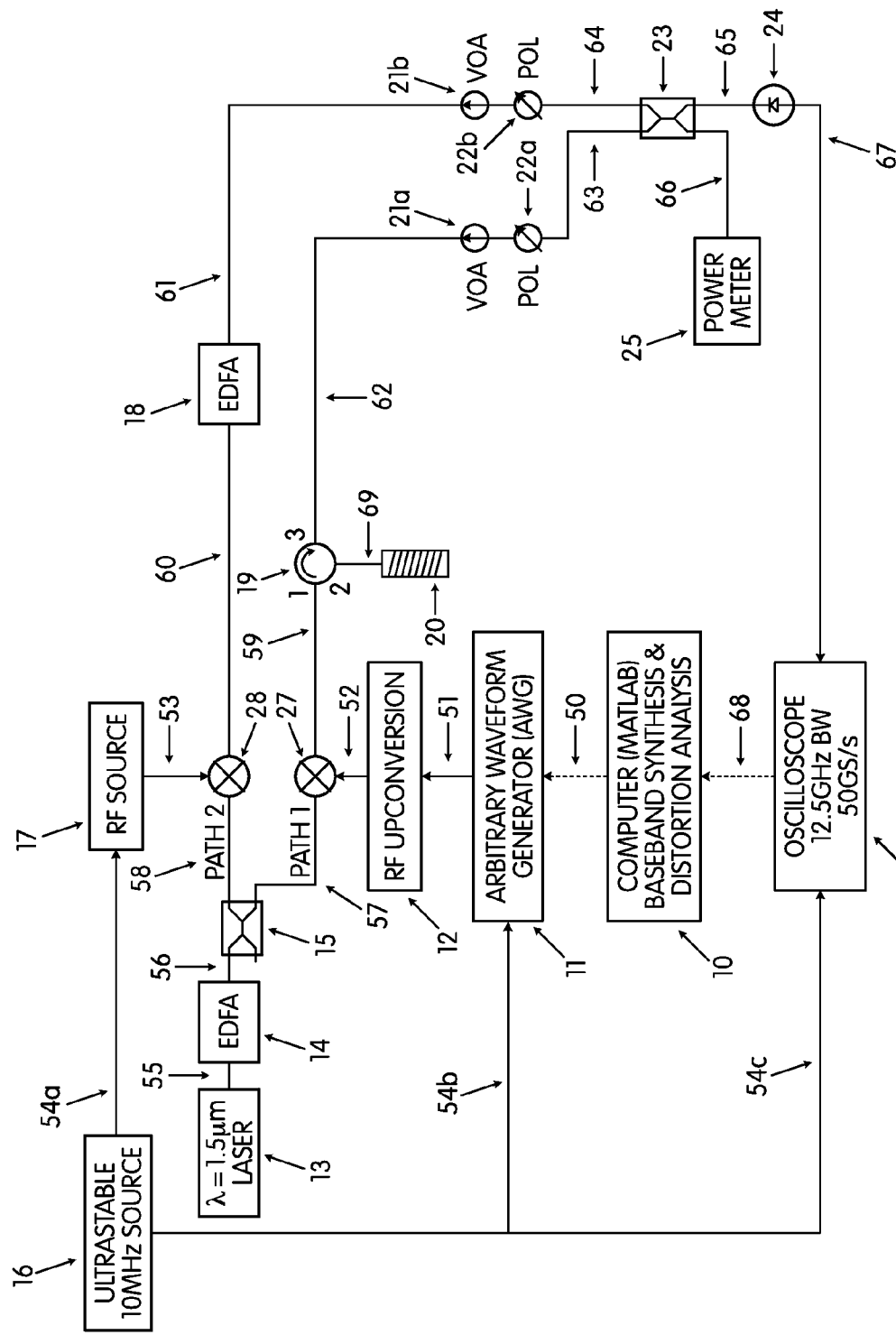
FIG. 2 shows an example system architecture for simultaneous waveform synthesis and characterization in accordance with various aspects of the present disclosure.

FIG. 2 shows an example system architecture block diagram that enables linearly frequency modulated optical waveforms (LFM) to be simultaneously synthesized and characterized. Waveform synthesis begins on a computer (10) where digital samples (50) of a LFM waveform are created using software such as MATLAB manufactured by The MathWorks headquartered in Natick, Mass.; however, other suitable software platform may be used. LFM waveform samples (50) are transferred from computer (10) to memory inside arbitrary waveform generator (11). Arbitrary waveform generator (11) can clock the waveform samples from memory to a digital-to-analog converter, producing baseband radio frequency (RF) signal (51). Baseband RF signal (51) undergoes a series of time-bandwidth modifications in RF upconversion (12) to produce final RF signal (52) that will be modulated onto an optical carrier. For example, RF upconversion (12) can be done by using several stages of RF doublers, where each stage can increase the time-bandwidth property of the RF waveform by 2×.

Laser source (13), such as a narrow-linewidth, nominal 1.5 µm laser source, is configured to provide a low level, for example +13 dBm, optical carrier (55) that is amplified by amplifier (14), such as a Erbium-Doped Fiber Amplifier (EDFA), to increase optical carrier (56) power. Amplified optical carrier (56) can be split into two signals of equal power (57, 58) by splitter (15), such as a fiber-optic 50/50 splitter. Optical carrier on PATH1 (57) can be modulated by modulator (27), such as a Mach-Zehnder modulator, driven with final RF signal (52) to produce a dual-sideband, suppressed carrier (DSB-SC), linear frequency modulated optical waveform (59).

Figure 3:
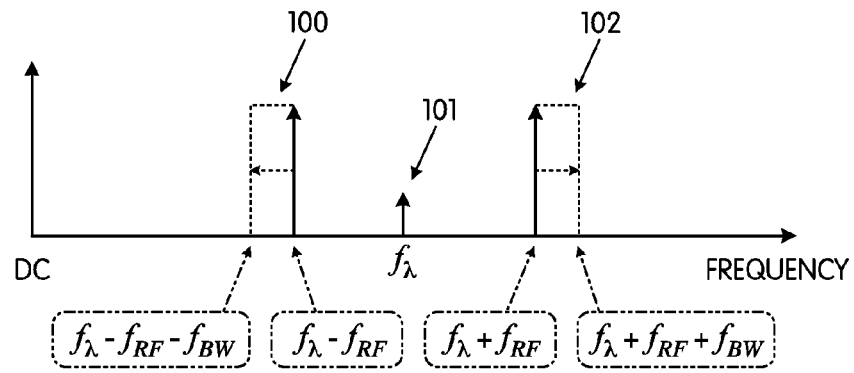
FIG. 3 shows an example of a frequency spectrum of a Dual-Sideband, Suppressed-Carrier (DSB-SC) waveform in accordance with various aspects of the present disclosure.

FIG. 3 shows the frequency spectrum of DSB-SC linear frequency modulated waveform (59). DSB-SC waveform has lower sideband (100), upper sideband (102) and some residual carrier (101) after modulation. The optical carrier (101; 57 of FIG. 2) has frequency $f_\lambda$, while final RF waveform (52) begins at frequency $f_{RF}$ and has bandwidth of $f_{BW}$ GHz.

Figure 4:
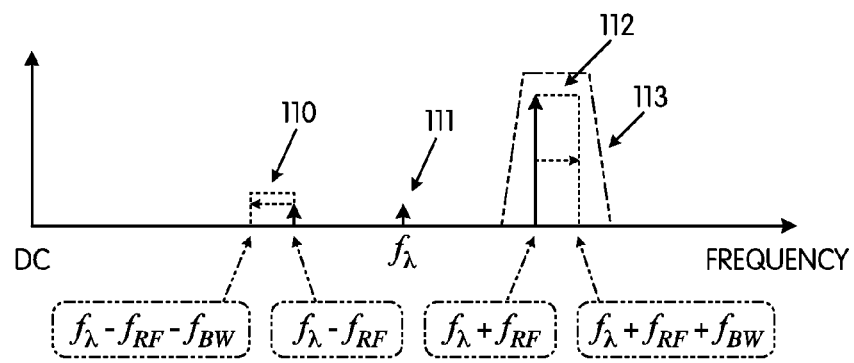
FIG. 4 shows an example frequency spectrum of a Single-Sideband, Suppressed-Carrier (SSB-SC) waveform.

Returning to FIG. 2, DSB-SC LFM optical waveform (59) can pass through optical circulator (19) to grating (20), such as a Fiber Bragg Grating, operating in reflection mode (69). Grating (20) can filter one sideband of DSB-SC LFM optical waveform to produce single-sideband, suppressed-carrier (SSB-SC) LFM optical waveform (62) shown in FIG. 4.

Grating (20; 113 of FIG. 4) can pass upper sideband (102 of FIG. 2; 112 of FIG. 4) and filter lower sideband (100 of FIG. 3) and optical carrier (101 of FIG. 3) from DSB-SC waveform (50). Some residual lower sideband signal (110) may remain along with some residual optical carrier (111), but these residual signal components are below the signal power of the upper sideband (112), for example 30-45 dB below the signal power.

Figure 5:
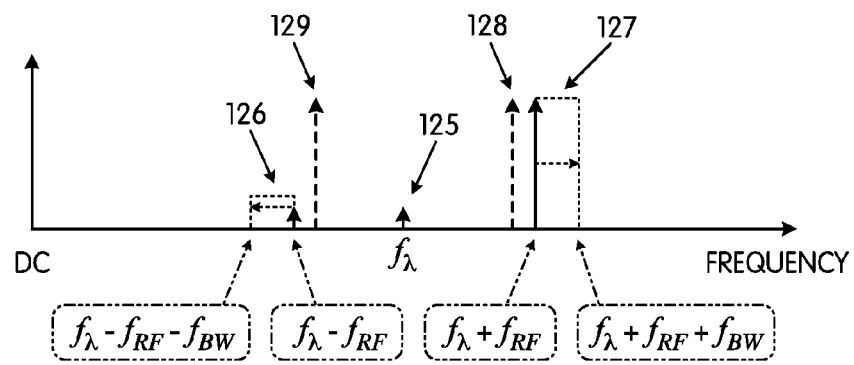
FIG. 5 shows an example of a frequency spectrum for optical heterodyne and RF waveform recovery in accordance with various aspects of the present disclosure.

Optical carrier on PATH2 (58) can be modulated by modulator (28), for example a $2^{nd}$ Mach-Zehnder modulator, driven by constant frequency RF signal (53) synthesized by RF source (17) to produce DSB-SC optical carrier (60) having upper sideband (128 of FIG. 5) and lower sideband (129 of FIG. 5). DSB-SC optical carrier (60) can be amplified by amplifier (18), for example an EDFA optical amplifier, to produce local oscillator optical carrier (61).

Local oscillator optical carrier (61) signal power and polarization can be controlled via a variable optical attenuator (VOA) (21a) and a polarization controller (22a) to produce the final local oscillator optical carrier (63). In similar fashion, SSB-SC LFM optical waveform (62) signal power and polarization can be controlled via $2^{nd}$ VOA (21b) and polarization controller (22b) to prepare signal (64) for optical mixing.

Attenuated, polarized local oscillator optical carrier (63) and attenuated, polarized, SSB-SC LFM optical waveform (64) can be mixed in optical combiner/splitter (23), for example a 99/1 optical combiner/splitter. One percent of the power can be split off (66) to be measured on power meter (25), for example an IR power meter. Ninety nine percent of the mixed optical signals (65) can illuminate detector (24), for example a high-bandwidth InGaAs detector, where optical heterodyne can occur. FIG. 5 shows the frequency spectrum of the mixed optical signals (65) that are optically heterodyned on InGaAs detector (24).

Heterodyning of optical carrier (128) and SSB-SC LFM optical waveform (112 of FIG. 4; 127 of FIG. 5) can produce RF signal (67) which is the difference in optical frequency between the two signals; the RF waveform at Reference 67 has identical bandwidth to the RF waveform at Reference 52, but now contains the distortion created by the RF and optical components during waveform synthesis. RF waveform (67) from detector (24) can be digitized by oscilloscope (26), such as a high-bandwidth oscilloscope, and the digitized oscilloscope data (68) can be transferred to computer (10) for distortion analysis.

The algorithms for distortion analysis are now discussed. Legendre Polynomials are a mathematically orthogonal basis set over the interval of [−1, 1]. Equations 4, 5 and 6 provide the definition of Legendre Polynomials and the principle of orthogonality; i.e., if any two Legendre Polynomials $P_m(x)$ and $P_n(x)$ are integrated over the interval [−1, 1], the result will be zero. Finally, if the same order Legendre Polynomials are integrated over the interval of [−1, 1], the result is a constant that depends on the polynomial order, n.

$$P_n(x) = \frac{1}{2^n n!} \frac{d^n}{dx^n}(x^2-1)^n \quad (4)$$

$$\int_{-1}^{1} P_m(x) P_n(x) \, dx = 0 \quad (5)$$

$$\int_{-1}^{1} P_n(x) P_n(x) \, dx = \frac{2}{2n+1} \quad (6)$$

The definition of Legendre Polynomials presented in Equations 4, 5 and 6 has one minor problem for implementation in algorithms and software which is that it requires repeated derivatives which are not easy to program. An alternative definition, based upon a recursive definition known as "Rodriguez' formula", is presented as Equations 7, 8 and 9. Unlike differentiation, recursion is readily adaptable to software programming; hence Equations 7, 8 and 9 better suited for synthesizing Legendre Polynomials in software.

$$P_n(x) = \frac{(2n-1) x P_{n-1}(x) - (n-1) P_{n-2}(x)}{n} \quad (7)$$

$$P_0(x) = 1 \quad (8)$$

$$P_1(x) = x \quad (9)$$

The recovered signal phase history from the digitized waveform (67) can be defined as $\phi_{ADC}(t)$, and the theoretical phase history for a perfect CW signal can be defined as $\phi_{THEO}(t)$. The recovered signal and theoretical CW phase histories can be defined as a sum of N Legendre Polynomials with scaling coefficients as shown in Equations 10 & 11; $P_n(x)$ defines the $n^{th}$ order Legendre Polynomial basis vector. A collection of scaling coefficients, $A_0$-$A_n$, represent the recovered phase history, while a similar group of scaling coefficients, $B_0$-$B_n$, represent the theoretical phase history.

$$\phi_{ADC}(t) \approx A_0 P_0(x) + A_1 P_1(x) + A_2 P_2(x) + \ldots = \sum_{n=0}^{N-1} A_n P_n(x) \quad (10)$$

$$\phi_{THEO}(t) = \omega_0 t \approx B_0 P_0(x) + B_1 P_1(x) + B_2 P_2(x) + \ldots = \sum_{n=0}^{N-1} B_n P_n(x) \quad (11)$$

Using the orthogonality principle, the individual scaling coefficients, $A_n$ and $B_n$, can be calculated, from their respective phase data, $\phi_{ADC}(t)$ and $\phi_{THEO}(t)$. This is analogous to computing Fourier Frequency-Domain Coefficients from time-domain data. Combining Equations 10 and 11 with the orthogonality principle defined in Equation 6, Equations 12 and 13 can be obtained to define how to compute the $n^{th}$ order Legendre scaling coefficients, $A_n$ and $B_n$, from the recovered phase history and the theoretical phase history respectively.

$$A_n = \frac{2n+1}{2} \sum_{k=0}^{M-1} \phi_{ADC}[k] P_n[k] \quad (12)$$

$$B_n = \frac{2n+1}{2} \sum_{k=0}^{M-1} \phi_{THEO}[k] P_n[k] \quad (13)$$

Similar to Fourier analysis, the signal properties can be compared in Legendre space and the distortion measured in the recovered signal phase history, $\phi_{ADC}(t)$. Equation 14 defines how the distortion, $D_n$, is computed for the $n^{th}$ order Legendre basis vector; N defines the number of Legendre basis vectors required to accurately model the signals. Each difference coefficient, $D_n$, is computed by subtracting the measured phase coefficient, $A_n$, from the theoretical phase coefficient, $B_n$. The distortion for the $0^{th}$ and $1^{st}$ order terms, which represent DC phase and linear phase offset need not be determined since they are not required for phase compensation.

$$D_n = B_n - A_n, 2 \leq k \leq N-1 \quad (14)$$

Each Legendre difference coefficient, $D_n$, is defined for the full-bandwidth signal. In order to perform phase compensation, the distortion coefficient is transformed or input-referred to baseband signal bandwidth (51) initially produced by digital-to-analog converter (DAC) in AWG (11). Equation 15 defines a bandwidth based scaling coefficient for this input-referred mapping; L defines the total number of bandwidth scaling operations that occur in the RF and optical hardware (12).

$$R_{BW} = 10 \, LOG_{10}(2^L) \quad (15)$$

Equation 16 defines the initial or $0^{th}$ generation baseband waveform (50) synthesized in the software platform, such as Matlab, and loaded into the AWG; $\phi_{BB0}(t)$ defines a theoretical linear FM chirp and is identical to Equation 2. The $j^{th}$ generation baseband waveform (11), defined in Equation 17, is iteratively generated by adding the input-referred distortion, $D_{j,k}$ for $1 < k < N-1$, to the previous generation baseband waveform. It has been found by the inventors through hardware experiments that typically 4 to 5 iterations are needed for proper convergence and ultra-high fidelity phase compensation, however, more or less can be used depending on the application.

$$\phi_{BB_0}(t) = \omega_0 t + \frac{u}{2} t^2 \quad (16)$$

$$\phi_{BB_J}(t) \approx \phi_{BB_{J-1}}(t) + \frac{D_{j,2}}{R_{BW}} P_2(x) + \frac{D_{j,3}}{R_{BW}} P_3(x) + \ldots + \frac{D_{j,N-1}}{R_{BW}} P_{N-1}(x) = \phi_{BB_{J-1}}(t) + \frac{1}{R_{BW}} \sum_{k=2}^{N-1} D_{j,k} P_k(x) \quad (17)$$

Phase compensation via Legendre Polynomial decomposition is based upon the idea that the master oscillator is a low phase-noise device. While such oscillators are readily obtainable in the RF domain, lasers do not generally possess this characteristic. The optical phase of a laser can be described as a function of three terms, shown in Equation 18.

$$\phi_\lambda(t) = 2\pi f_\lambda t + \phi_{ST}(t) + \phi_{RW}(t) \quad (18)$$

The first term of Equation 18 defines phase from a nominal optical frequency, $f_\lambda$. The second term, $\phi_{ST}(t)$, is a stationary white noise process, implying it has zero-mean and constant variance over time. The third term, $\phi_{RW}(t)$, is a random walk process.

During phase compensation, the stationary white noise process, $\phi_{ST}(t)$, should converge to zero-mean if enough pulses are captured per waveform generation. It can be argued that during the short waveform duration, a narrow-linewidth laser's random walk, $\phi_{RW}(t)$, behaves as a similar white noise source that can be averaged to zero with enough waveform observations per generation.

Phase compensation algorithm performance and convergence are graphically depicted in FIG. 6 through FIG. 9. For these Figures, black is the theoretically best achievable pulse compression via FFT derived from the theoretical phase history of Equation 2. The dotted lines are of four individual pulse compressions acquired over a five minute interval for each waveform generation. As the phase compensation algorithm calculates and refines the distortion measurements of the RF and optical hardware, one observes the synthesized signal pulse compression graphed in a dotted line converge and match the theoretical compression graphed black in the presence of phase noise from the laser.

Figure 6:
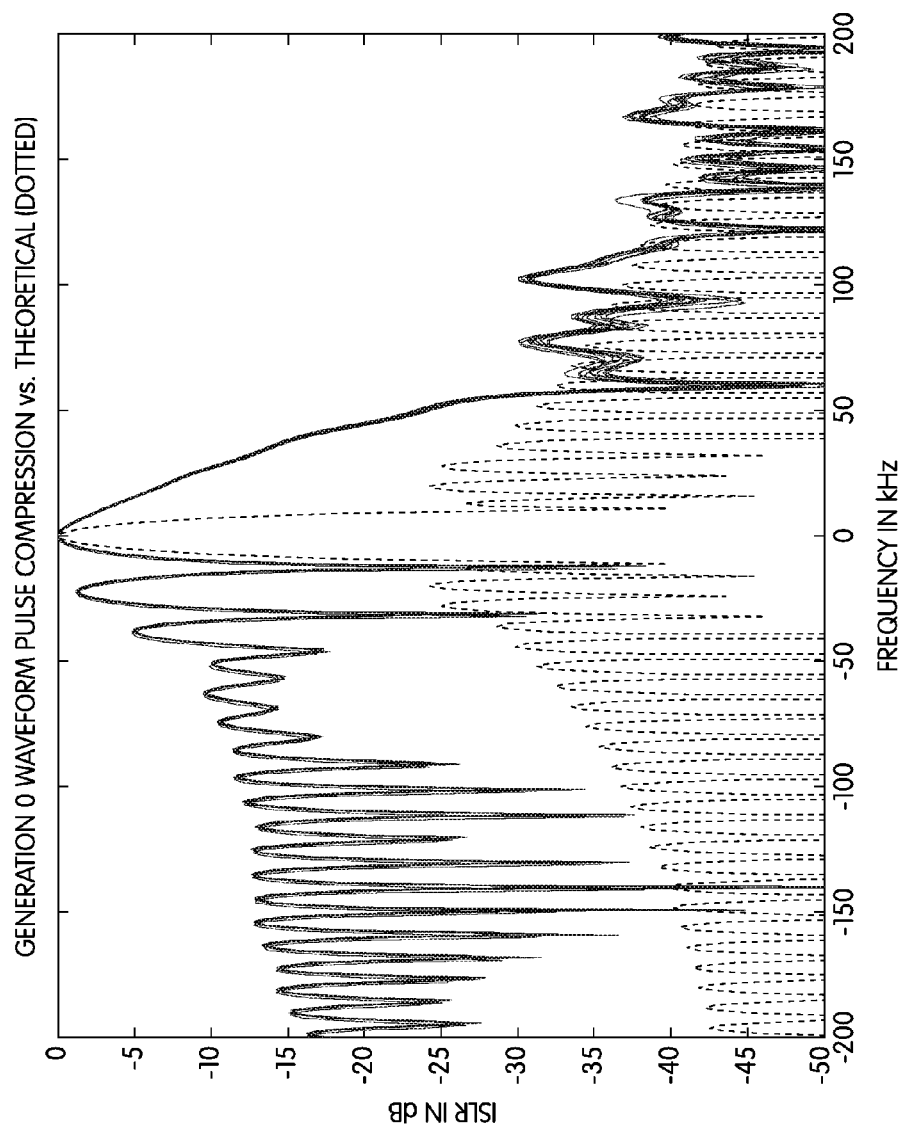
FIG. 6 shows an example frequency spectrum for unmodified, generation 0 waveform (dotted line) compared with theoretical (line) in accordance with various aspects of the present disclosure.
Figure 7:
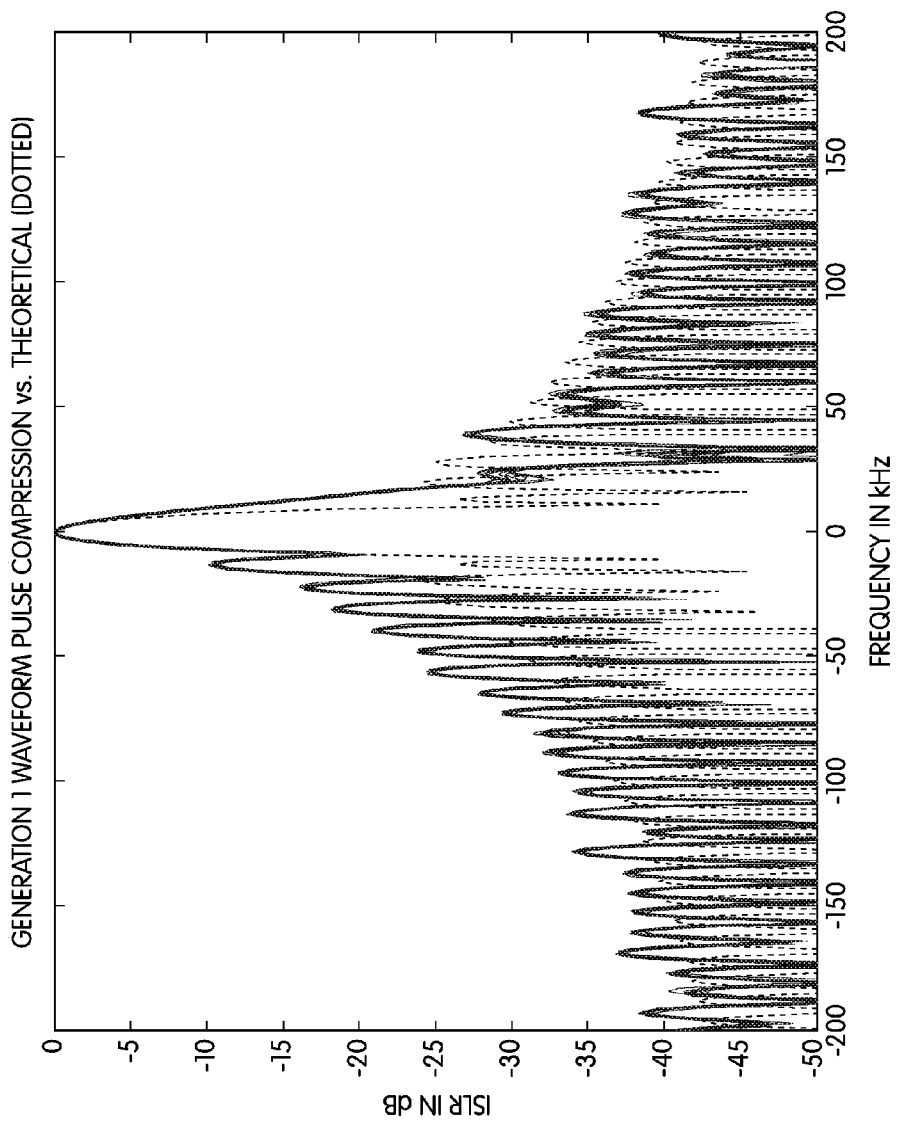
FIG. 7 shows an example frequency spectrum for generation 1 waveform (dotted line) compared to theoretical (line) in accordance with various aspects of the present disclosure.
Figure 8:
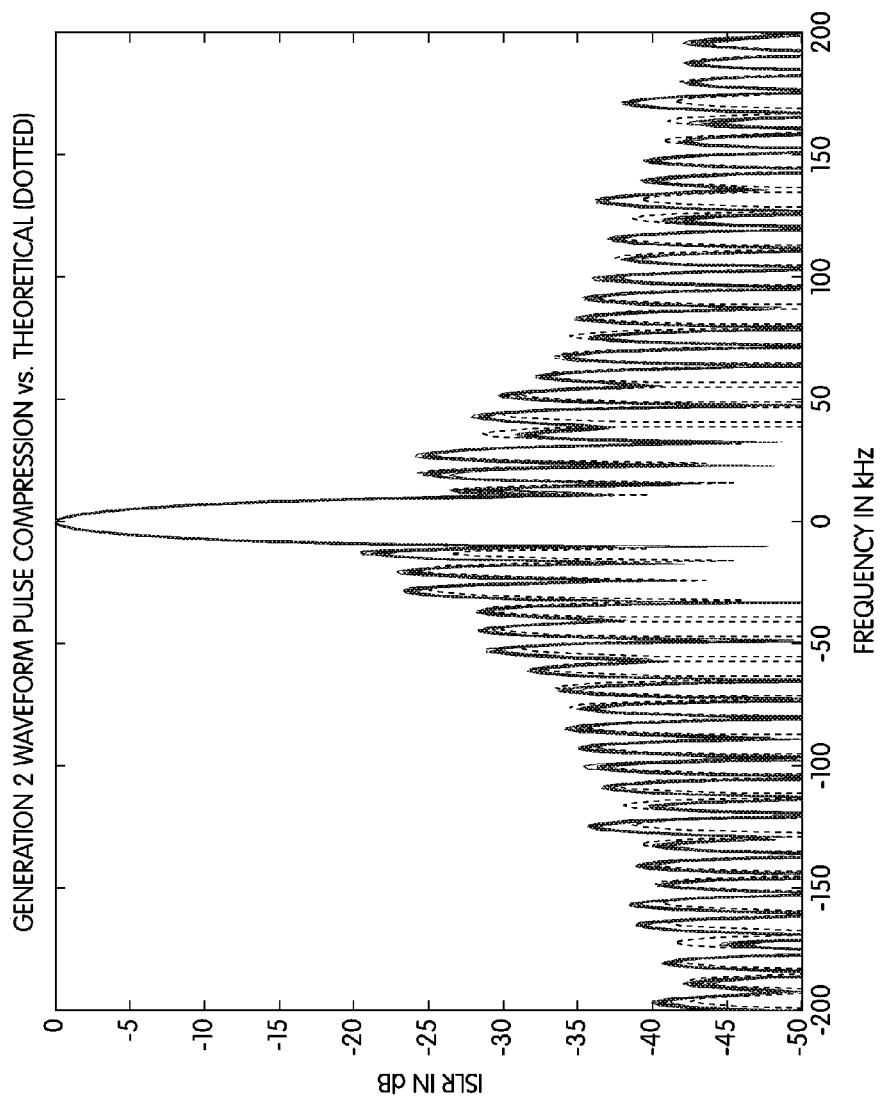
FIG. 8 shows an example frequency spectrum for generation 2 waveform (dotted line) compared to theoretical (line) in accordance with various aspects of the present disclosure.
Figure 9:
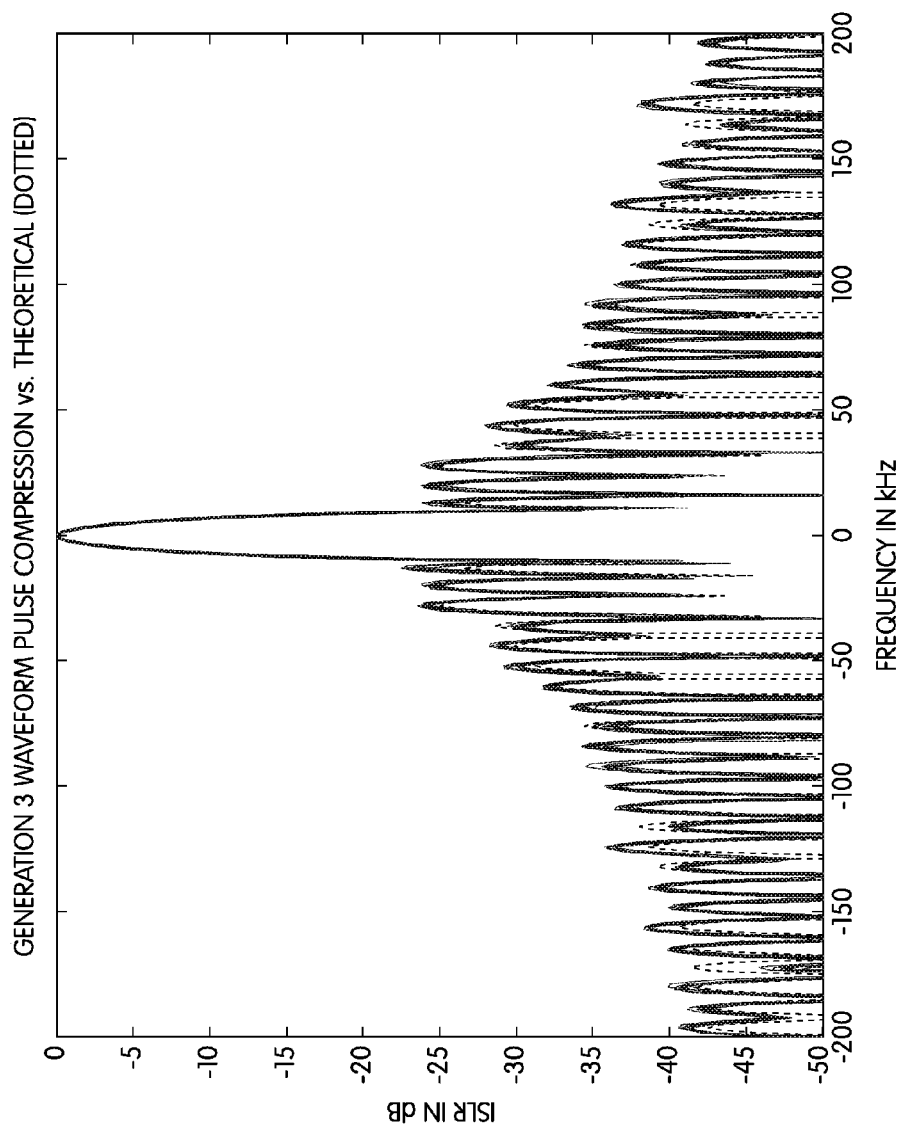
FIG. 9 shows an example frequency spectrum for generation 3 waveform (dotted line) compared to theoretical (line) in accordance with various aspects of the present disclosure.

FIG. 6 through FIG. 9 shows the synthesis, iterative measurement and subsequent phase compensation of an ultra-high bandwidth optical waveform over multiple waveform iterations with actual hardware. FIG. 6 shows an unmodified, generation 0 waveform (dotted line) compared with theoretical (line) in accordance with various aspects of the present disclosure. FIGS. 7-9 show generation 1, 2 and 3 waveform, respectively, compared with the theoretical (line).

Figure 10:
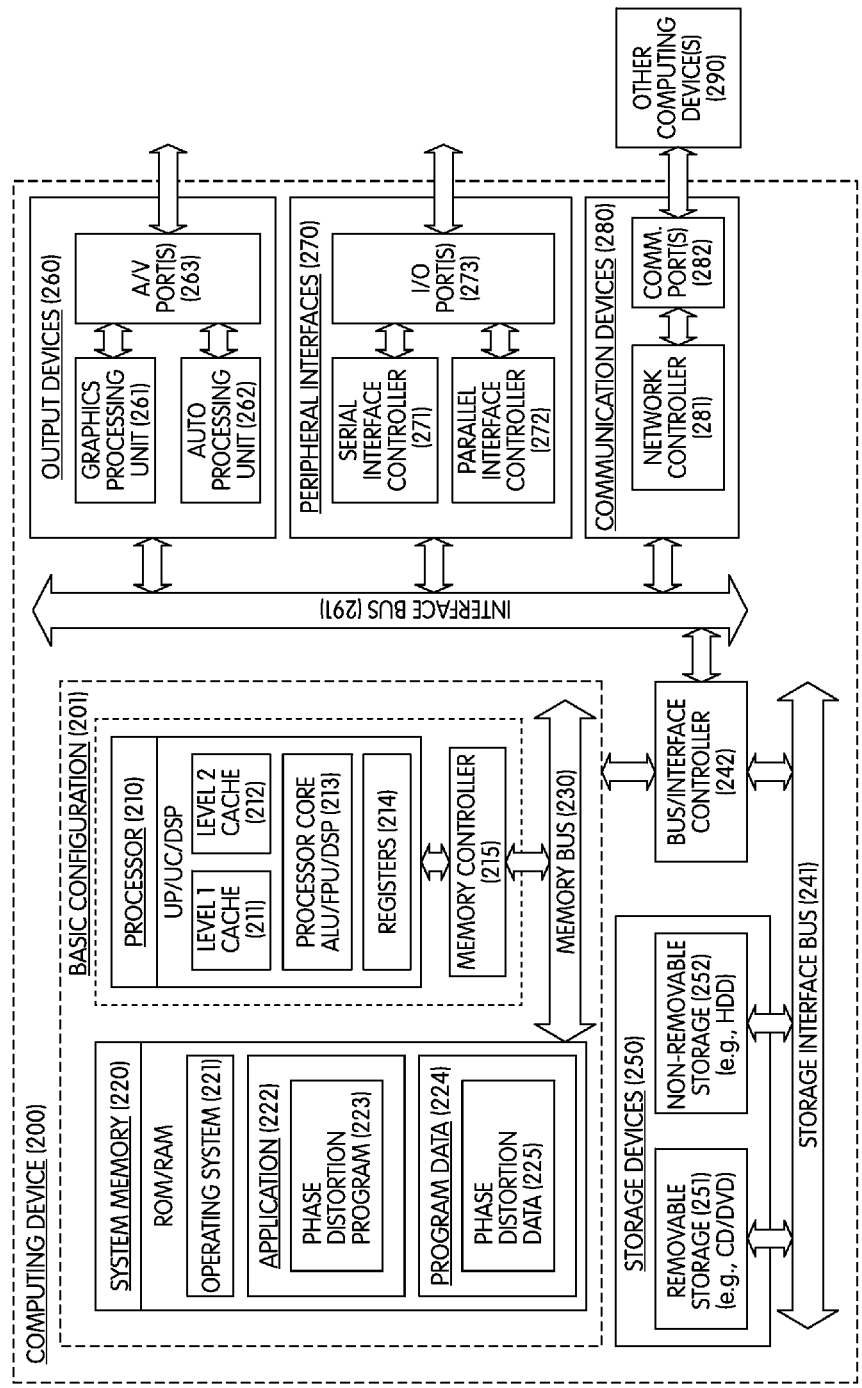
FIG. 10 is a block diagram illustrating an example computing device that is arranged to perform the various processes and/or methods in accordance with the various aspects of the present disclosure.

FIG. 10 is a block diagram illustrating an example computing device 200 that is arranged to perform the various processes and/or methods in accordance with the various aspects of the present disclosure. In a very basic configuration 201, computing device 200 typically includes one or more processors 210 and a system memory 220. A memory bus 230 may be used for communicating between processor 210 and system memory 220.

Depending on the desired configuration, processor 210 may be of any type including but not limited to a microprocessor (µP), a microcontroller (µC), a digital signal processor (DSP), or any combination thereof. Processor 210 may include one more levels of caching, such as a level one cache 211 and a level two cache 212, a processor core 213, and registers 214. An example processor core 213 may include an arithmetic logic unit (ALU), a floating point unit (FPU), a digital signal processing core (DSP Core), or any combination thereof. An example memory controller 215 may also be used with processor 210, or in some implementations memory controller 215 may be an internal part of processor 210.

Depending on the desired configuration, system memory 220 may be of any type including but not limited to volatile memory (such as RAM), non-volatile memory (such as ROM, flash memory, etc.), or any combination thereof. System memory 220 may include an operating system 221, one or more applications 222, and program data 224. Application 222 may include one or more of the various algorithms, processes or methods 223, as discussed above, that is arranged to perform the functions as described with respect to processes of FIGS. 1-9. Program data 224 may include data 225 that may be useful for one or more of the various algorithms, methods or processes as described herein. In some embodiments, application 222 may be arranged to operate with program data 224 on operating system 221 such that implementations of the various algorithms, processes or methods may be provided as described herein. This described basic configuration 201 is illustrated in FIG. 10 by those components within the inner dashed line.

Computing device 200 may have additional features or functionality, and additional interfaces to facilitate communications between basic configuration 201 and any required devices and interfaces. For example, a bus/interface controller 242 may be used to facilitate communications between basic configuration 201 and one or more data storage devices 250 via a storage interface bus 241. Data storage devices 250 may be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 220, removable storage devices 251 and non-removable storage devices 252 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 200. Any such computer storage media may be part of computing device 200.

Computing device 200 may also include an interface bus 291 for facilitating communication from various interface devices (e.g., output devices 260, peripheral interfaces 270, and communication devices 280) to basic configuration 201 via bus/interface controller 242. Example output devices 260 include graphics processing unit 261 and audio processing unit 262, which may be configured to communicate to various external devices such as a display or speakers via one or more A/V ports 263. Example peripheral interfaces 270 include serial interface controller 271 or parallel interface controller 272, which may be configured to communicate with external devices such as input devices (e.g., keyboard, mouse, pen, voice input device, touch input device, etc.) or other peripheral devices (e.g., printer, scanner, etc.) via one or more I/O ports 273. An example communication device 280 includes network controller 281, which may be arranged to facilitate communications with one or more other computing devices 290 over a network communication link via one or more communication ports 282.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both physical storage media and communication media.

Computing device 200 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 200 may also be implemented as a personal computer including both laptop computer and non-laptop computer configurations.

Although the above disclosure discusses what is currently considered to be a variety of useful embodiments, it is to be understood that such detail is solely for that purpose, and that the appended claims are not limited to the disclosed embodi- What is being claimed:

1. A method for characterizing, in the presence of optical carrier phase noise, and compensating for deterministic phase nonlinearities and distortion inherent in radio frequency and optical components to modify time-bandwidth properties of a radio frequency waveform and synthesize a single sideband suppressed carrier optical waveform in the presence of random phase noise generated by an optical carrier source, the method comprising:

mixing a modulated optical signal with a constant frequency optical signal in an optical coupler;

optically heterodyning the mixed signal output from the optical coupler in a detector to produce a radio frequency waveform;

digitizing the radio frequency waveform by an analog to digital converter to produce one or more digital waveform representations of the radio frequency waveform;

comparing the digitized radio frequency waveform in a processor to known, theoretical phase history of a preselected continuous wave signal to measure distortion characteristics of the radio frequency modulated optical signal; and transforming the measured distortion characteristics to a baseband signal bandwidth by input-referred mapping by a bandwidth based scaling coefficient;

wherein analyzed, characterized and transformed waveform distortion components of the digitized radio frequency waveform are used to pre-compensate the radio frequency waveform.

2. The method according to claim 1, further comprising: digitally mixing the one or more digital waveform samples with a preselected waveform to extract one or more waveform distortion components from the digitized radio frequency waveform.

3. The method according to claim 2, further comprising: using the processor to analyze and characterize the one or more waveform distortion components using Legendre Polynomials.

4. A system for characterizing, in the presence of optical carrier phase noise, and compensating for deterministic phase nonlinearities and distortion inherent in radio frequency and optical components to modify time-bandwidth properties of a radio frequency waveform and synthesize a single sideband suppressed carrier optical waveform in the presence of random phase noise generated by an optical carrier source, the system comprising:

an optical coupler configured to mix a modulated optical signal with a constant frequency optical signal;

an optical detector configured to receive the mixed signal output from the optical coupler and optically heterodyne the mixed signal to produce a radio frequency waveform;

an analog to digital converter configured to digitize the radio frequency waveform to produce one or more digital waveform samples of the radio frequency waveform; and a processor in communication with a memory having instructions stored therein which, when executed compare the digitized radio frequency waveform to a known, theoretical phase history of a preselected continuous wave signal and measure distortion characteristics of the radio frequency modulated optical signal, and wherein the processor transforms the measured distortion characteristics to a baseband signal bandwidth by input-referred mapping by a bandwidth based scaling coefficient, wherein analyzed, characterized and transformed waveform distortion components of the digitized radio frequency waveform are used to pre-compensate the radio frequency waveform.

5. The system according to claim 4, wherein the processor is configured to digitally mix the one or more digital waveform samples with a preselected waveform to extract one or more waveform distortion components from the digitized radio frequency waveform.

6. The system according to claim 5, wherein the processor is configured to analyze and characterize the one or more waveform distortion components using Legendre Polynomials.

7. A computer-readable physical medium including instructions that, when executed by a processor, cause the processor to carry out functions related to compensating for deterministic phase nonlinearities and distortion in a radio frequency and optical components to modify time-bandwidth properties of a radio frequency waveform and synthesize a single sideband suppressed carrier optical waveform, the functions comprising:

generating a first waveform comprising a linear frequency modulated chirp;

determining a distortion component from a received second waveform;

transforming the measured distortion component to a baseband signal bandwidth by input-referred mapping by a bandwidth based scaling coefficient; and modifying the first waveform using the transformed distortion component to pre-compensate for the deterministic phase nonlinearities and distortion of the received second waveform produced by the radio frequency components and the one or more optical components.

8. The computer-readable medium according to claim 7, further comprising repeating the determining and modifying until the first waveform is substantially free of the phase nonlinearities and the distortion.

9. The computer-readable medium according to claim 7, wherein the distortion component is determined by using Legendre Polynomials.

10. The computer-readable medium according to claim 7, further comprising modifying a bandwidth of the received second waveform to conform to a bandwidth of the first waveform.

* * * * *